United States Patent
Nishimura

(10) Patent No.: US 7,502,139 B2
(45) Date of Patent: Mar. 10, 2009

(54) IMAGE FORMING APPARATUS AND METHOD, AND IMAGE FORMING SYSTEM

(75) Inventor: Takeshi Nishimura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 903 days.

(21) Appl. No.: 10/345,321

(22) Filed: Jan. 16, 2003

(65) Prior Publication Data

US 2004/0001207 A1 Jan. 1, 2004

(30) Foreign Application Priority Data

Jun. 28, 2002 (JP) .............................. 2002-191475

(51) Int. Cl.
*G06F 15/00* (2006.01)
*G03F 3/00* (2006.01)
*G06K 15/00* (2006.01)
*G06K 9/46* (2006.01)

(52) U.S. Cl. .................... 358/1.9; 358/518; 358/519; 358/1.16; 382/162; 382/166; 382/167; 382/235

(58) Field of Classification Search .................. 358/1.2, 358/1.9, 2.1, 518, 519, 524, 539; 382/162, 382/166, 167, 232, 235
See application file for complete search history.

(56) References Cited

U.S. PATENT DOCUMENTS

| 5,757,965 A | * | 5/1998 | Ohki ........................ 382/232 |
| 6,044,172 A | * | 3/2000 | Allen ........................ 382/166 |
| 6,181,823 B1 | * | 1/2001 | Takahashi .................. 382/232 |
| 6,661,845 B1 | * | 12/2003 | Herath .................. 375/240.23 |
| 2004/0091042 A1 | * | 5/2004 | Herath ...................... 375/240 |
| 2004/0190635 A1 | * | 9/2004 | Ruehle ...................... 375/253 |

FOREIGN PATENT DOCUMENTS

JP A 11-98343 4/1999

* cited by examiner

*Primary Examiner*—Edward L Coles
*Assistant Examiner*—Thomas J Lett
(74) *Attorney, Agent, or Firm*—Oliff & Berridge, PLC

(57) ABSTRACT

An image forming apparatus includes a first processing unit and a second processing unit. The first processing unit receives multi-valued first compressed image data in accordance with a first compression format that is a variable length compression format. The first compressed image data are externally transferred to the first processing unit. The first processing unit then converts the first compressed image data into second compressed image data in accordance with a second compression format. The second processing unit performs expansion and binarization processes on the second compressed image data, and outputs the second compressed image data to a printer engine.

8 Claims, 4 Drawing Sheets

Fig. 2
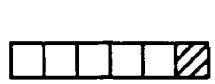
☐ : RED
▨ : BLUE
ORIGINAL DATA    0000FF00 0000FF00 0000FF00 0000FF00 0000FF00 000000FF
COMPRESSED DATA    <u>00000005</u> 0000FF00 <u>00000001</u> 000000FF
(UNDERLINED PARTS ARE HEADERS)
Fig. 3
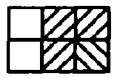
ORIGINAL DATA
☐ : RED
▨ : BLUE
▧ : BLACK
0000FF00 000000FF 000000FF
0000FF00 000000FF 00000000
COMPRESSED DATA
<u>00000003</u> 0000FF00 000000FF 000000FF
<u>00020001</u> 00000000
(UNDERLINED PARTS ARE HEADERS)

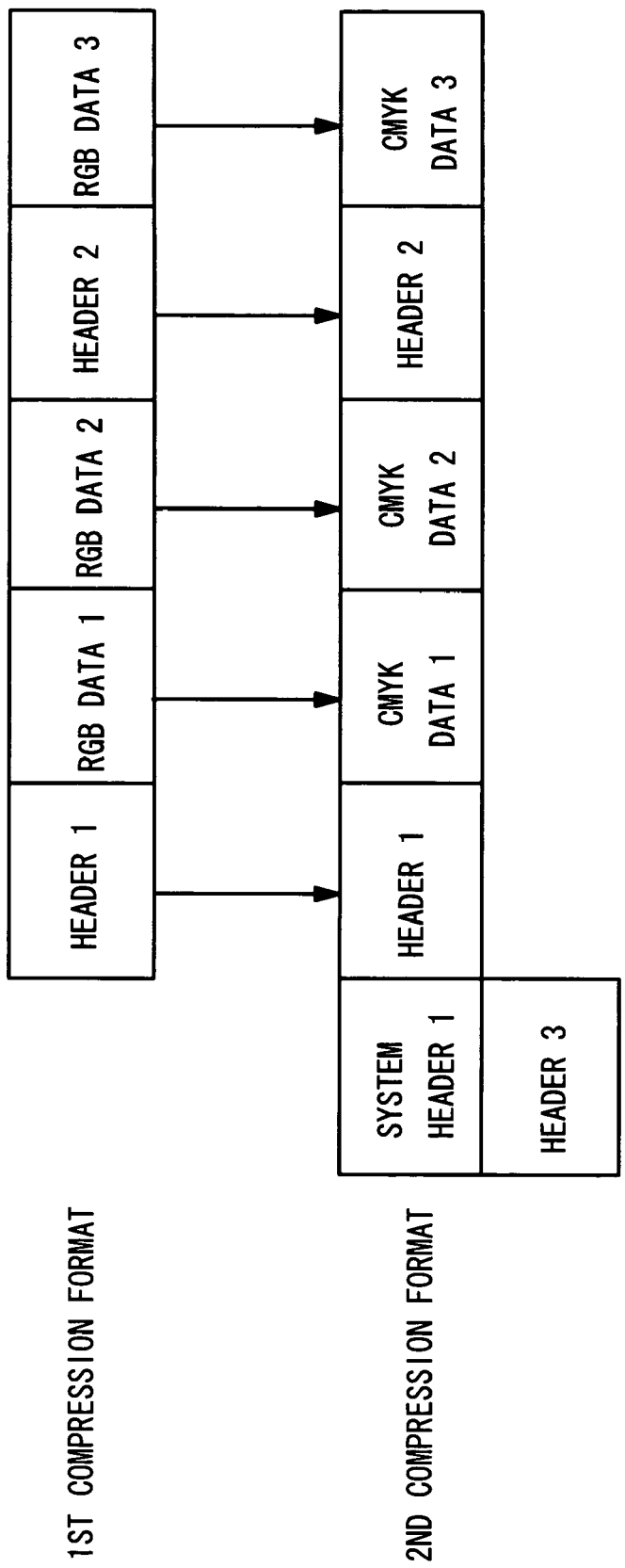

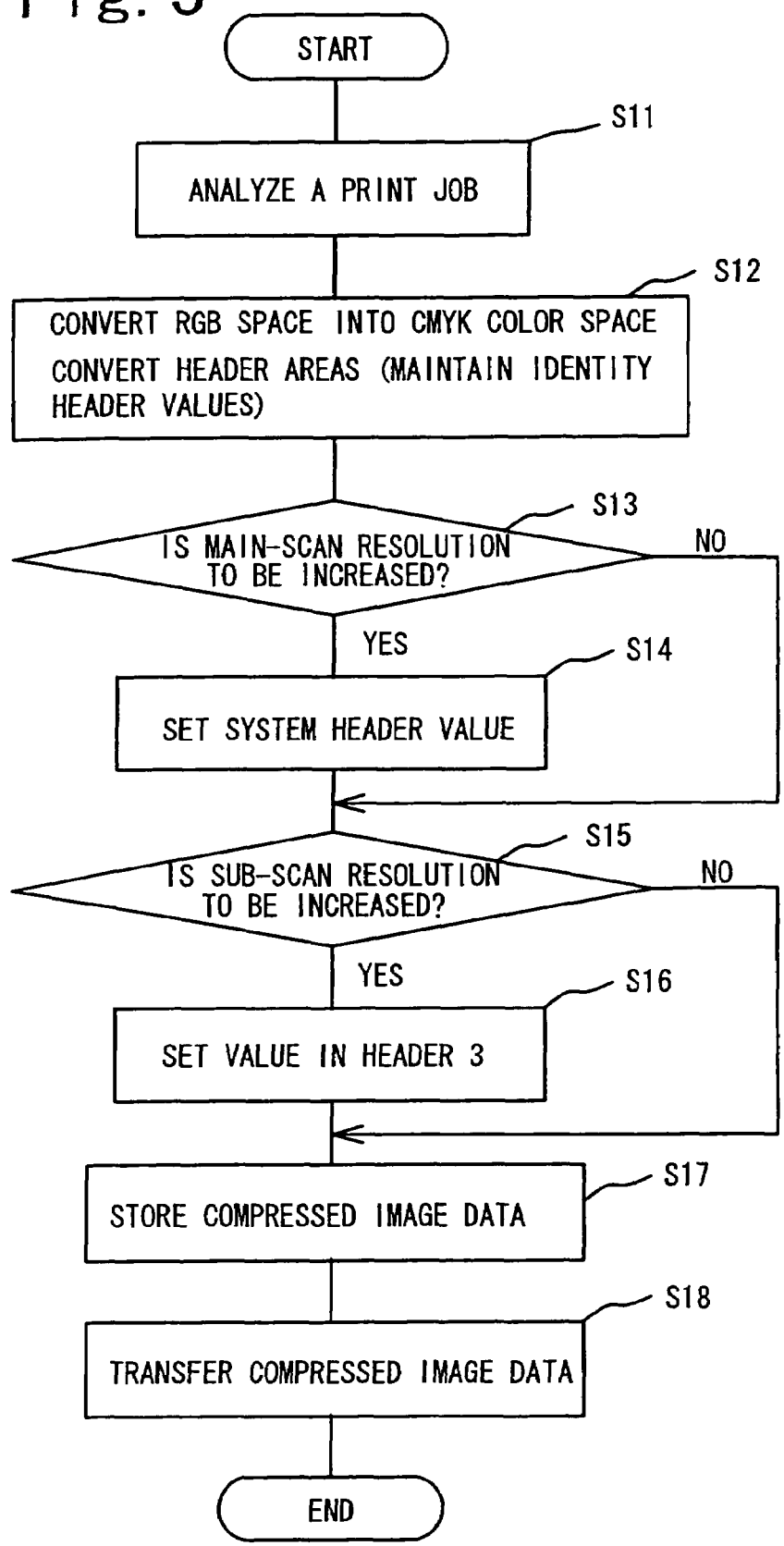

IMAGE FORMING APPARATUS AND METHOD, AND IMAGE FORMING SYSTEM

BACKGROUND OF THE INVENTION

1. Field of the Invention

The present invention generally relates to an image forming apparatus and method for forming images on paper and an image forming system, and more particularly, to processing of compressed image data.

2. Description of the Related Art

In general, an image forming apparatus of this type is designed to internally process compressed image data transferred from a host computer that serves as a host device, and then output the image data to a printer engine. Various formats have been suggested and put into practice for compressed image data transferred from a host computer to an image forming apparatus. For example, Japanese Unexamined Patent Publication No. 11-98343 discloses a technique of outputting fixed-length compressed RGB image data from a host computer to a printer. In a case where each color data of RGB is 8-bit long, 384-bit bitmap image data of 4×4 pixels are constantly compressed to data of a fixed length of 64 bits.

However, as fixed-length compressed image data are transferred from a host computer to a printer, it takes the printer a long period of time to receive and process the compressed image data. Also, there is a problem of requiring a large-capacity memory for storing fixed-length compressed image data inside the printer.

SUMMARY OF THE INVENTION

The present invention has been made in view of the above circumstances and provides an image forming apparatus and method, and an image forming system in which the above disadvantages are eliminated.

More specifically, the present invention provides an image forming apparatus and method for processing compressed image data at a high speed with a small memory capacity, and an image forming system including such an image forming apparatus.

According to an aspect of the present invention, there is provided an image forming apparatus including: a first processing unit that receives multi-valued first compressed image data in accordance with a first compression format that is a variable length compression format, and converts the first compressed image data into second compressed image data in accordance with a second compression format, the first compressed image data being externally transferred to the first processing unit; and a second processing unit that performs expansion and binarization processes on the second compressed image data, and outputs the second compressed image data to a printer engine.

According to another aspect of the present invention, there is provided an image forming method including the steps of: receiving multi-valued first compressed image data in accordance with a first compression format that is a variable-length compression format, the first compressed image data being externally transferred; converting the first compressed image data into second compressed image data in accordance with a second compression format; performing expansion and binarization processes on the second compressed image data; and outputting the second compressed image data to a printer engine.

According to yet another aspect of the present invention, there is provided an image forming system comprising: a host computer; and an image forming apparatus that is connected to the host computer, and includes a first processing unit that converts multi-valued first compressed image data in accordance with a first compression format as a variable-length compression format into second compressed image data in accordance with a second compression format, and a second processing unit that performs expansion and binarization processes on the second compressed image data and then outputs the second compressed image data to a printer engine, the first compressed image data being transferred from the host computer to the first processing unit.

BRIEF DESCRIPTION OF THE DRAWINGS

Preferred embodiments of the present invention will be described in detail based on the following figures, wherein:

FIG. 2 illustrates a variable-length compressing process to be performed on RGB image data in a main-scan direction;

FIG. 3 illustrates a variable-length compressing process to be performed on RGB image data in a sub-scan direction;

FIG. 4 illustrates an example of a format conversion process; and

FIG. 5 is a flowchart of an operation to be performed by the image forming apparatus in the image forming system in accordance with an image forming method of the present invention.

DESCRIPTION OF THE PREFERRED EMBODIMENTS

Figure 1:
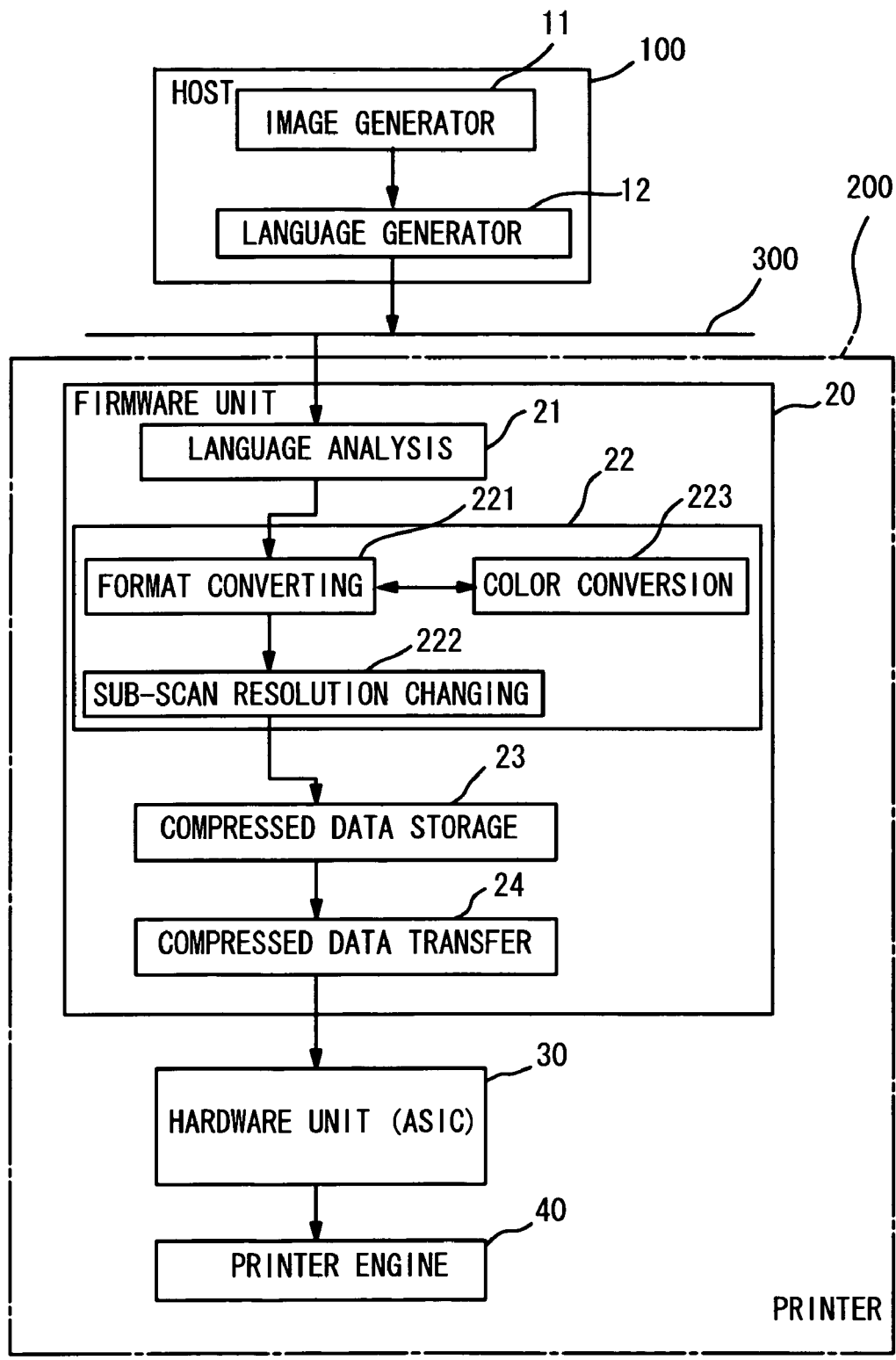
FIG. 1 is a block diagram illustrating an image forming apparatus and an image forming system including the image forming apparatus in accordance with one embodiment of the present invention.

The following is a detailed description of embodiments of the present invention, with reference to the accompanying drawings.

FIG. 1 is a block diagram illustrating an image forming apparatus and an image forming system including the image forming apparatus in accordance with an embodiment of the present invention. The image forming system includes a host computer 100, a printer 200 that is an example of the image forming apparatus, and a network 300 that connects the host computer 100 and the printer 200. The network 300 may be a cable network or a wireless network such as a LAN to which multiple devices are connected, or a cable that connects the host computer 100 and the printer 200 exclusively to each other.

The host computer 100 may be a personal computer that performs predetermined rendering and generates RGB multi-valued variable-length compressed image data. The variable-length compressed image data are transferred to the printer 200 via the network 300. The printer 200 performs a color conversion process, an expansion process, and a binarization process on the variable-length compressed image data. The printer 200 then drives a printer engine 40. Other than the printer engine 40, the printer 200 includes a firmware unit 20 and a hardware unit 30 respectively serving as first and second units. The firmware unit 20 is realized through a software process, and the hardware unit 30 is formed by an ASIC (Application Specific Integrated Circuit) or the like. The firmware unit 20 is equivalent to programs in a microcomputer. Accordingly, the structure of the firmware 20 shown in FIG. 1 is the same as the program structure of a microcomputer. In this embodiment, as a color conversion process (or a resolution conversion process) is performed on the variable-length compressed image data, the firmware unit 20 performs the color conversion process, while the hardware unit 30 performs the expansion and binarization processes.

The host computer 100 includes an image generator 11 and a language generator 12, which are substantially formed through a software process of the host computer 100. The image generator 11 generates RGB image data. The language generator 12 compresses the RGB image data in accordance with a variable-length compression format, and creates a print job containing the compressed image data. Other than the compressed image data, the print job contains attribute information such as the size of the original document, the page setting, and the resolution.

Referring now to FIGS. 2 and 3, operations of compressing RGB image data in accordance with a variable-length compression format will be described. FIG. 2 illustrates a variable-length compressing operation for RGB image data in a main-scan direction. FIG. 3 illustrates a variable-length compressing operation for RGB image data in a sub-scan direction.

FIG. 2 shows six sets of multi-valued image data as an example of original data. The six sets of image data include five sets of red image data arranged in a row, followed by one set of blue data. Each set of red image data is coded as "0000FF00", and each set of blue image data is coded as "000000FF". The original data are compressed in accordance with the runlength coding that is an example of a variable-length compression format. As a result, the compressed data shown in FIG. 2 are obtained. The compression format in which the compressed data are written includes a header area and a data field area. The data that are underlined in FIG. 2 are headers that represent run lengths stored in the header area, and the remaining data are actual data stored in the data field area. The header value of the first header "00000005" indicates that it is followed by five sets of red actual data "0000FF00", and the header value of the next header "00000001" indicates that it is followed by one set of blue actual data "000000FF". In this manner, the headers represent the processing sequence of the compressed image data. Accordingly, the length of the compressed data depends on the original data, and is compressed at a high compression rate.

FIG. 3 illustrates two lines that are continuous in the sub-scan direction, as an example of original data. The upper line in the figure includes one set of red data and two successive sets of blue data. The lower line includes one set of red data, one set of blue data, and one set of black data, in this order. The original data are compressed in accordance with a delta row compression technique that is an example of a variable-length compression format. As a result, the compressed data shown in FIG. 3 are obtained. In the two lines shown as the compressed data, the underlined data represent headers, and the remaining data represent actual data. The header value "00000003" of the header on the first line indicates that there are three successive sets of actual data. This header is followed by one set of red actual data and two sets of blue actual data. The header value "00020001" on the second line describes the difference between the first line and the second line. More specifically, the header on the second line indicates that the first two sets of actual data on the second line are the same as those on the first line, but the remaining one set is different from that on the first line. This header is followed by one set of black actual data that is the different set of actual data from the first line. In this manner, the headers represent the processing sequence of the compressed image data. Accordingly, the length of the compressed data depends on the original data, and is compressed at a high compression rate.

The image data compressed in accordance with the variable-length compression formats illustrated in FIGS. 2 and 3 are then transferred to the printer 200 via the network 300. The compressed data shown in FIG. 2 may be outputted to the printer 200, separately from the compressed data shown in FIG. 3. Alternatively, the variable-length compression formats shown in FIGS. 2 and 3 may be combined, and variable-length compressed image data in accordance with the combined variable-length compression format may be transferred to the printer 200.

The firmware unit 20 includes a language analysis unit 21, a compressed data processing unit 22, a compressed data storage unit 23, and a compressed data transfer unit 24. The language analysis unit 21 analyzes each print job transmitted from the host computer 100, and divides it into attribute information and compressed image data. The attribute information is processed by an attribute information processing unit (not shown). The processed attribute information is referred to within the firmware unit 20 when necessary, and also is outputted to the hardware unit 30. The processing of the attribute information is performed by a known method, and therefore explanation for it is omitted in this specification. The compressed image data are sent to the compressed data processing unit 22.

The compressed data processing unit 22 includes a format converting unit 221, a sub-scan resolution changing unit 222, and a color conversion memory 223. The format converting unit 221 converts the variable-length compression formats specified in the host computer 100 and the printer 200 (i.e., the formats for the compressed data shown in FIGS. 2 and 3) into a compression format specified in the firmware unit 20 and the hardware unit 30. This format conversion is illustrated in FIG. 4. Hereinafter, the variable-length compression formats specified in the host computer 100 and the printer 200 will be referred to as the first compression format, and the compression format specified in the firmware unit 20 and the hardware unit 30 will be referred to as the second compression format, for convenience of explanation.

As described above, each of the variable-length compression formats shown in FIGS. 2 and 3 (i.e., the first compression format) includes a header area that stores headers, and a data field area that stores actual data. Likewise, the second compression format that will be described below includes a header area and a data field area. The actual data are image data of the RGB color space, and are to be converted into image data of the CMYK color space by the format converting unit 221. The colors C (cyan), M (magenta), Y (yellow), and K (black) are an example of colors used in the printer engine 40. To change the color spaces, the format converting unit 221 refers to the color conversion memory 223. The color conversion memory 223 holds the image data of the CMYK color space (or the output color space) corresponding to the image data of the RGB color space (or the input color space). For instance, the image data of the RGB color space serve as the address of the color conversion memory 223. The image data of the CMYK color space obtained in this manner are placed immediately after the corresponding header, as shown in FIG. 4. In the example shown in FIG. 4, RGB data 1 is converted into CMYK data 1, and RGB data 2 is converted into CMYK data 2. Likewise, RGB data 3 is converted into CMYK data 3. The data conversion from the RGB color space into the CMYK color space is directly performed in this manner. In other words, data of the RGB color space are not converted into data of a color space of some other compression format during the conversion.

Meanwhile, the header values of the variable-length compression formats shown in FIGS. 2 and 3 also serve as the header values of the compression format specified in the hardware unit 30, as shown in FIG. 4. The header area of the second compression format includes at least either a header part for storing header information as to the main-scan resolution or a header part for storing header information as to the sub-scan resolution, as well as a header part for storing header information that represents the actual data processing sequence.

The headers 1 and 2 of the variable-length compression format shown in the upper half of FIG. 4, i.e., the first compression format, are the same as the headers 1 and 2 of the second compression format shown in the lower half of FIG. 4. For instance, the first header value "00000005" of the compressed data shown in FIG. 2 also serves as a header value of the compression format of the printer engine 40. Accordingly, the header information in the first compression format is substantially the same as the header information in the second compression format. This implies that the actual data processing sequence indicated by the header information in the first compression format is identical with the actual data processing sequence indicated by the header information in the second compression format, but the header information in the first compression format may not be completely the same as the header information in the second compression format. For instance, even if the bit number of each header in the first compression format differs from the bit number of each header in the second compression format, the identity between the header information in the first compression format and the header information in the second compression format is maintained, as long as they indicate the same processing sequences for actual data.

The format converting unit 221 does not only convert the RGB color space data into the CMYK color space data, but also provides a system header to represent an increase from the main-scan resolution of the first compression format to the main-scan resolution of the printer engine 40. The system header is attached to the top of the first header 1 in the second compression format. In FIG. 4, the system header is shown as a system header 1. For instance, in a case where the main-scan resolution of compressed image data transferred from the host computer 100 is 300 dpi while the main-scan resolution of the printer engine 40 is 600 dpi, a header value "2" is written in the system header 1. The compressed image data arranged in accordance with the second compression format including the system header are then sent to the sub-scan resolution changing unit 222.

The sub-scan resolution changing unit 222 then performs such an expansion process that the sub-scan resolution of the compressed image data transferred from the host computer 100 matches the sub-scan resolution of the printer engine 40. For instance, in a case where the sub-scan resolution of the compressed image data transferred from the host computer 100 is 300 dpi while the sub-scan resolution of the printer engine 40 is 600 dpi, a header value that indicates "double" is attached as a header 3, as shown in FIG. 4. The location of the header 3 in FIG. 4 is on the line below the system header 1, so that it can be easily understood that the header 3 indicates an increase of the sub-scan resolution. However, the location of the header 3 is not limited to the above. As long as the header 3 is positioned beforehand, the location of it can be chosen arbitrarily. If the delta row compression technique is employed for compression, the value of the header 3 shows the identity with the line immediately above the header 3.

In a case where the resolution of compressed image data in the first compression format is 400 dpi×400 dpi while the resolution of the printer engine 40 is 800 dpi×800 dpi, "2" is written in the system header 1, and a value that indicates the identity with the line immediately above the header 3 is written in the header 3. In a case where the resolution of compressed image data in the first compression format is 400 dpi×800 dpi while the resolution of the printer engine 40 is 800 dpi×800 dpi, "2" is written in the system header 1, but a predetermined value indicating that no expansion operations are to be performed is written in the header 3.

The compressed image data rearranged in the second compression format in the above manner are then stored in the compressed data storage unit 23 shown in FIG. 1, and are transferred to the hardware unit 30 formed by an ASIC via the compressed data transfer unit 24.

The hardware unit 30 expands the compressed image data, and transfers it to the printer engine 40 after subjecting it to binarization. The printer engine 40 then prints the image formed by the binarized data on a paper sheet.

FIG. 5 is a flowchart of the operation of the firmware unit 20 shown in FIG. 1. The language analysis unit 21 shown in FIG. 1 analyzes a print job in the above described manner, and divides it into attribute information and RGB compressed image data (step S11). The format converting unit 221 of the compressed data processing unit 22 converts the compressed image data in the first compression format into compressed image data in the second compression format, and also performs a conversion process on the header area that maintains the identity among the header values in the manner described with reference to FIGS. 2 through 4 (step S12). The format converting unit 221 further determines whether the main-scan resolution should be increased. The main-scan resolution of the image data in the first compression format can be detected from the attribute information. The main-scan resolution of the image data in the second compression format is stored beforehand in the format converting unit 221. If the main-scan resolution should be increased, the format converting unit 221 sets the system header value shown in FIG. 4 in the above described manner (step S14). The sub-scan resolution changing unit 222 shown in FIG. 1 then determines whether the sub-scan resolution should be increased (step S15). The sub-scan resolution of the image data in the first compression format can be detected from the attribute information. The sub-scan resolution of the image data in the second compression format is stored beforehand in the sub-scan resolution changing unit 222. If the sub-scan resolution should be increased, the sub-scan resolution changing unit 222 sets a header value in the header 3 shown in FIG. 4 in the above described manner (step S16). The compressed data storage unit 23 temporarily holds the image data arranged in the second compression format shown in FIG. 4 (step S17). The compressed data transfer unit 24 reads the compressed image data from the compressed data storage unit 23, and transfers it to the hardware unit 30.

As described so far, the following effects can be obtained from the above described embodiment.

Since the printer 200 is to receive variable-length compressed image data, i.e., variable-length compressed image data are transferred from the host computer 100 to the printer 200, compressed image data processing can be performed at a high speed, even if the compression rate is high and the memory capacity is small. Here, the memory capacity is the capacity of the buffer inside the printer 200 that temporarily holds the data received from the network 300.

Also, since the color conversion (including the resolution conversion) for variable-length compressed image data is performed in the firmware unit 20 while the expansion and binarization are performed in the hardware unit 30 in this embodiment, color space conversion and expansion can be efficiently performed with a small work memory capacity. If the expansion and binarization are performed in the firmware unit 20, the process speed decreases due to a large number of color conversion processes and the binarization process. In such a case, a large part of the work memory is also consumed. If the color conversion, the expansion, and the binarization are all performed in the hardware unit 30 formed by an ASIC, a module for the color conversion needs to be installed, resulting in an increase of production costs.

Further, since image data in the first compression format are converted (in terms of colors and resolutions) directly into image data in the second compression format in this embodiment, the firmware processes can be performed with a high efficiency. Here, the header values in the first compression format are also used as the header values in the second compression format, so that the two compression formats have the same header values. Accordingly, the direct conversion can be easily and efficiently performed.

Furthermore, a main-scan resolution and a sub-scan resolution can be easily converted by simply adding a header to the directly converted compressed image data. By adding data concerning the main-scan resolution of the printer engine to the compression format, an image can easily be enlarged in the main scan direction.

It should be noted that the present invention is not limited to the above embodiment. Although the color printer 200 has been described as an example of an image forming apparatus, embodiments of the present invention also include other image forming apparatuses such as color facsimile machines and color multi-function apparatuses. Also, examples of printing methods include various types such as laser printing methods and ink jet printing methods. Further, compression methods include any other methods that are similar to the runlength compression and the delta row compression.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising:

a first processing unit that receives multi-valued first compressed image data of a first color space in accordance with a first compression format that is a variable length compression format, and directly converts the first compressed image data into second compressed image data of a second color space different from the first color space without any expansion in accordance with a second compression format, the first compressed image data being received by the first processing unit from a host computer over a network; and a second processing unit that performs expansion and binarization processes on the second compressed image data, and outputs the second compressed image data to a printer engine, wherein the first compression format involves compression of image data of a reference line, and compression of image data of a line adjacent to the reference line.

2. An image forming apparatus comprising:

a first processing unit that receives multi-valued first compressed image data of a first color space in accordance with a first compression format that is a variable length compression format, and directly converts the first compressed image data into second compressed image data of a second color space different from the first color space without any expansion in accordance with a second compression format, the first compressed image data being received by the first processing unit from a host computer over a network; and a second processing unit that performs expansion and binarization processes on the second compressed image data, and outputs the second compressed image data to a printer engine, wherein the first compression format employs a compression technique of writing information indicating actual data and lengths thereof with respect to a reference line, and also employs a compression technique of writing information indicating the difference from the reference line with respect to a line adjacent to the reference line.

3. An image forming apparatus comprising:

a first processing unit that receives multi-valued first compressed image data of a first color space in accordance with a first compression format that is a variable length compression format, and directly converts the first compressed image data into second compressed image data of a second color space different from the first color space without any expansion in accordance with a second compression format, the first compressed image data being received by the first processing unit from a host computer over a network; and a second processing unit that performs expansion and binarization processes on the second compressed image data, and outputs the second compressed image data to a printer engine, wherein the first processing unit sets header information contained in the first compression format and relating to a processing sequence of the first compressed image data, as header information contained in the second compression format, and adjusts the number of bits in the header information contained in the second compression format to the same number as the number of bits in the header information contained in the first compression format.

4. An image forming apparatus comprising:

a first processing unit that receives multi-valued first compressed image data of a first color space in accordance with a first compression format that is a variable length compression format, and directly converts the first compressed image data into second compressed image data of a second color space different from the first color space without any expansion in accordance with a second compression format, the first compressed image data being received by the first processing unit from a host computer over a network; and a second processing unit that performs expansion and binarization processes on the second compressed image data, and outputs the second compressed image data to a printer engine, wherein the conversion process performed by the first processing unit includes color space conversion.

5. An image forming apparatus comprising:

a first processing unit that receives multi-valued first compressed image data of a first color space in accordance with a first compression format that is a variable length compression format, and directly converts the first compressed image data into second compressed image data of a second color space different from the first color space without any expansion in accordance with a second compression format, the first compressed image data being received by the first processing unit from a host computer over a network; and a second processing unit that performs expansion and binarization processes on the second compressed image data, and outputs the second compressed image data to a printer engine, wherein:

compressed image data in accordance with the first compression format represent a RGB color space; and compressed image data in accordance with the second compression format represent a CMYK color space.

6. An image forming apparatus comprising:

a first processing unit that receives multi-valued first compressed image data of a first color space in accordance with a first compression format that is a variable length compression format, and directly converts the first compressed image data into second compressed image data of a second color space different from the first color space without any expansion in accordance with a second compression format, the first compressed image data being received by the first processing unit from a host computer over a network; and a second processing unit that performs expansion and binarization processes on the second compressed image data, and outputs the second compressed image data to a printer engine, wherein:

the first compression format includes a first header area and a first data field area that holds the first compressed image data; and the second compression format includes a second header area and a second data field area that holds the second compressed image data.

7. The image forming apparatus as claimed in claim 6, wherein:

the first header area holds header information relating to a processing sequence of the first compressed image data; and the second header area includes a header part that holds header information relating to a processing sequence of the second compressed image data, and another header part that holds header information relating to a resolution.

8. The image forming apparatus as claimed in claim 6, wherein the second header area includes at least either one of a header part that stores header information relating to a main-scan resolution of the second compressed image data, and a header part that holds header information relating to a sub-scan resolution of the second compressed image data.

* * * * *